United States Patent [19]

Prasad

[11] Patent Number: 4,931,070
[45] Date of Patent: Jun. 5, 1990

[54] PROCESS AND SYSTEM FOR THE PRODUCTION OF DRY, HIGH PURITY NITROGEN

[75] Inventor: Ravi Prasad, East Amherst, N.Y.

[73] Assignee: Union Carbide Corporation, Danbury, Conn.

[21] Appl. No.: 350,849

[22] Filed: May 12, 1989

[51] Int. Cl.⁵ .......................................... B01D 53/22
[52] U.S. Cl. ........................................ 55/16; 55/68; 55/158
[58] Field of Search ........................... 55/16, 68, 158

[56] References Cited

U.S. PATENT DOCUMENTS

| | | | |
|---|---|---|---|
| 3,144,313 | 8/1964 | Pfefferle | 55/16 |
| 3,339,341 | 9/1967 | Maxwell et al. | 55/16 |
| 3,735,558 | 5/1973 | Skarstrom et al. | 55/16 |
| 3,735,559 | 5/1973 | Salemme | 55/16 |
| 3,735,599 | 5/1973 | Izumichi et al. | 62/21 |
| 3,967,464 | 7/1976 | Cromier et al. | 62/13 |
| 4,119,417 | 10/1978 | Heki et al. | 55/158 |
| 4,140,499 | 2/1979 | Ozaki et al. | 55/16 X |
| 4,264,338 | 4/1981 | Null | 55/158 X |
| 4,264,340 | 4/1981 | Sircar et al. | 55/25 |
| 4,448,595 | 5/1984 | Cheung | 62/31 |
| 4,453,957 | 6/1984 | Pahade et al. | 62/25 |
| 4,589,888 | 5/1986 | Hiscock et al. | 55/26 |
| 4,594,085 | 6/1986 | Cheung | 62/25 |
| 4,645,516 | 2/1987 | Doshi | 55/16 |
| 4,687,498 | 8/1987 | Maclean et al. | 62/17 |
| 4,690,695 | 9/1987 | Doshi | 55/16 |
| 4,701,187 | 10/1987 | Choe et al. | 55/16 |
| 4,718,921 | 1/1988 | Makino et al. | 55/16 |
| 4,783,201 | 11/1988 | Rice et al. | 55/16 |
| 4,834,779 | 5/1989 | Paganessi et al. | 55/16 |

FOREIGN PATENT DOCUMENTS

| | | | |
|---|---|---|---|
| 0186843 | 7/1986 | European Pat. Off. | 55/16 |
| 0226431 | 6/1987 | European Pat. Off. | |
| 62-042723 | 2/1987 | Japan | 55/16 |
| 62-192589 | 8/1987 | Japan | 55/16 |
| 62-241527 | 10/1987 | Japan | 55/16 |
| 63-182019 | 7/1988 | Japan | 55/16 |
| 63-209730 | 8/1988 | Japan | 55/16 |

OTHER PUBLICATIONS

Gas Separation by Permeation—C-Y Pan et al., The Canadian Journal of Chemical Engineering, vol. 56, Apr., 1978, pp. 197–209.
Gas Separation by Permeators with High-Flux Asymmetric Membranes—C-Y Pan, AIChE Journal, vol. 29, No. 4, Jul. 1983, pp. 545–552.
Asymmetric Cellulose Acetate Hollow Fibers: Studies in Gas Permeation—M. Sidhoum et al., AIChE Journal, Mar., 1988, vol. 34, No. 3, pp. 417–425.
C&EN, Apr. 29, 1985, p. 16, "Monsanto Tests Separator for Dehydration".
C&EN, Jul. 18, 1988, p. 35, "Membrane-Based Compressed Air Dryer".

Primary Examiner—Robert Spitzer
Attorney, Agent, or Firm—Alvin H. Fritschler

[57] ABSTRACT

High purity nitrogen from an air separation membrane/deoxo system is dried in a membrane dryer unit preferably operated with a countercurrent flow path in the membrane bundle. Drying is enhanced by the use of purge gas on the permeate side of the membrane dryer unit, with feed air, product nitrogen or waste gas from the air separation membrane system being used as purge gas.

23 Claims, 2 Drawing Sheets 4,931,070

PROCESS AND SYSTEM FOR THE PRODUCTION OF DRY, HIGH PURITY NITROGEN

BACKGROUND OF THE INVENTION

1. Field of the Invention

The invention relates to the production of nitrogen from air. More particularly, it relates to the production of dry, high purity nitrogen.

2. Description of the Prior Art

Permeable membrane processes and systems have been proposed and used increasingly for the production of nitrogen by air separation. In such operations, feed air is brought into contact with the surface of the membrane, and oxygen, as the more readily permeable component of air, passes through the membrane while nitrogen, the less readily permeable component of air, is withdrawn from the membrane system as a non-permeate product stream. Conventional membrane systems typically produce nitrogen having purity levels of up to about 99.5%. For some applications, however, a high purity nitrogen product, i.e. nitrogen having a purity of about 99.95% or more, e.g. 99.9995% purity, is required.

The conventional method of achieving such high nitrogen purity levels is to pass the product nitrogen from a membrane system to a deoxygenation system, i.e. a deoxo system, which is capable of converting residual oxygen in the product nitrogen stream to water by combining said oxygen with hydrogen in the presence of a noble metal catalyst. The resulting high purity nitrogen product generally will contain less than 5 parts per million by volume (ppmv) oxygen. However, it will also contain substantial quantities of water, e.g. from about 10,000 to about 40,000 ppm, as well as some excess hydrogen from the deoxo system. In many practical applications, it is desirable to remove such moisture from the high purity nitrogen stream, either to prevent condensation thereof and subsequent corrosion or freezing in the piping and instrumentation of downstream applications of said high purity nitrogen, or because the presence of such moisture is incompatible with the desired end use of the high purity product nitrogen stream recovered from the membrane/deoxo systems.

For purposes of removing moisture from the high purity nitrogen stream, aftercooler, moisture separator and adsorptive (or refrigerated) dryer units are generally incorporated into the overall system. While these units are effective in removing moisture so as to produce an essentially dry, high purity nitrogen product, they significantly increase the complexity of the overall process, reduce reliability, and may also result in a significant loss of nitrogen product. Such undesired loss of product is the result of purge requirements, blowdown losses and the like. In addition, this conventional approach for moisture removal may require the expenditure of a significant amount of additional energy for regeneration or refrigeration purposes.

It can be appreciated, therefore, that a desire exists in the art for improved processes and systems for the production of dry, high purity nitrogen product. In particular, this desire relates to improvements pertaining to the removal of moisture from high purity nitrogen produced by the convenient use of membrane/deoxo systems for air separation. More particularly, it is desired that effective removal of moisture be achieved at relatively low cost and energy consumption, without the significant product loss associated with the conventional use of adsorptive (or refrigerated) dryer units.

It is an object of the invention, therefore, to provide an improved process and system for the production of dry, high purity nitrogen product from air.

It is another object of the invention to provide a simplified membrane/deoxo process and system capable of producing dry, high purity nitrogen product.

It is a further object of the invention to provide an improved process and system for the production of high purity nitrogen in essentially dry form, without the significant product loss, contamination of product, and energy consumption associated with the conventional use of an adsorptive (or refrigerative) unit for the removal of moisture from high purity nitrogen product.

With these and other objects in mind, the invention is hereinafter described in detail, the novel features thereof being particularly pointed out in the appended claims.

SUMMARY OF THE INVENTION

A second membrane system is included in the overall high purity nitrogen production system to remove moisture from the high purity nitrogen product stream produced in the membrane/deoxo system. Such second membrane system, desirably operated with a countercurrent flow pattern, is refluxed on the low pressure permeate side with a relatively dry purge gas to reduce the area requirements of the membrane and to increase desired product recovery. Such purge stream is desirably obtained from the primary membrane process stream, from low pressure feed air or from the dry nitrogen product gas.

BRIEF DESCRIPTION OF THE DRAWINGS

The invention is hereinafter described with reference to the accompanying drawing in which.

DETAILED DESCRIPTION OF THE INVENTION

Figure 1:
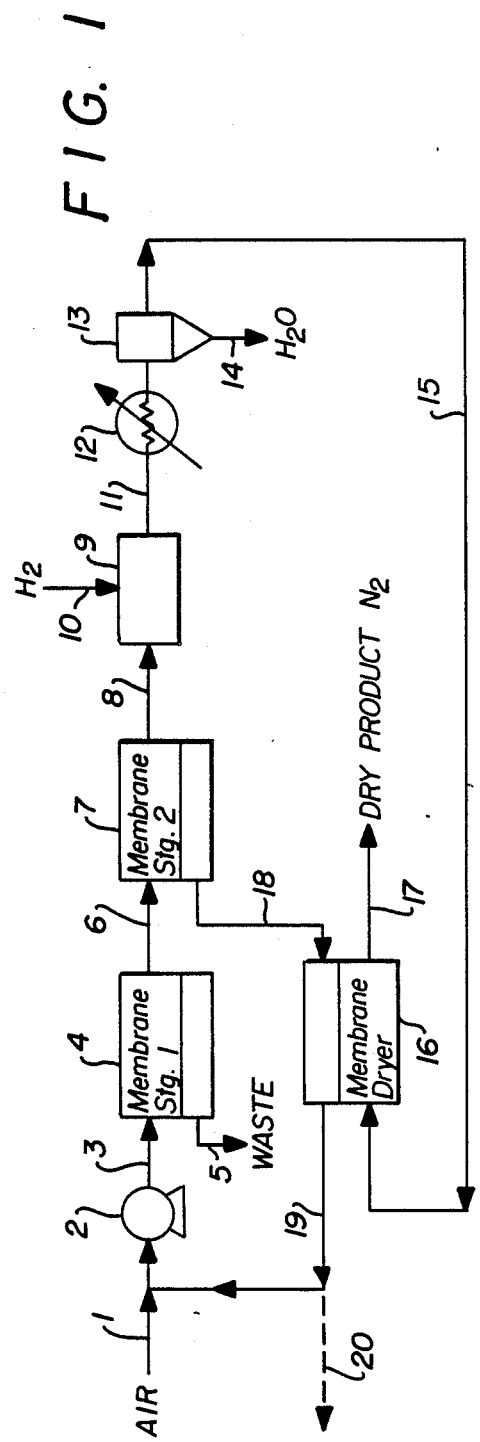
FIG. 1 is a schematic flow diagram of an embodiment of the invention in which permeate gas from the initial air separation membrane system is used to provide purge gas to the product dryer membrane system.

The objects of the invention are accomplished by the integration of a membrane system for nitrogen drying with the membrane/deoxo system under conditions enabling desired moisture removal from the high purity product to be accomplished without reduction in the overall process recovery of the process and system to unacceptable levels. Such conditions advantageously relate the integration of separate processing systems, and the selectivity for moisture removal of the particular membrane composition employed, with bundle design conditions under which countercurrent flow conditions are achieved in the dryer membrane system. This enables the nitrogen product to be successfully dried with minimum loss of said product during the drying operation.

For the production of dry, high purity nitrogen product in accordance with the practice of the invention, nitrogen is initially produced by single or two stage membrane air separation units. In these units, compressed air is fed to membrane modules at a pressure generally in the range of about 50 to about 300 psig, typically about 150 psig, at a temperature generally on the order of 90° F. A stream rich in oxygen, with respect to air, permeates the membrane material and is rejected at the low pressure, permeate side of the membrane. The nitrogen-rich retentate or non-permeate gas is recovered at the high feed pressure. In a two stage membrane air separation unit, the second stage permeate gas, which may have an oxygen concentration less than that of air is often recycled to the head of the plant for compression and recycle to the membrane unit. Since commonly known membrane systems are not currently capable of economically producing higher purity nitrogen product, i.e., 99.5% nitrogen or above, a catalytic deoxygenation, or deoxo, unit is employed to reduce the residual oxygen present in the nitrogen produced by the air separation membrane unit as indicated in the background discussion above. In conventional operations and in the practice of the invention, the exothermic heat of the deoxo reaction results in temperatures of typically about 500° C. The product gas therefrom is cooled in an aftercooler, and the resulting condensate is removed in a moisture separator prior to drying the high purity nitrogen stream.

The invention utilizes a membrane dryer unit, following the membrane/deoxo air separation units to economically produce a dry, high purity nitrogen product. While commercially available adsorptive or refrigerative dryer systems are capable of producing dry (−40° F. pressure dew point, i.e. PDP), or very dry (−100° F. PDP) gas streams, such dryer systems tend to be mechanically complex, result in undesired product loss or contamination, or require significant expenditure of energy, leading to the desire for improvements in the art that are satisfied by the use of a membrane dryer unit operated in accordance with the invention.

Certain membranes are known to selectively remove moisture (and hydrogen) from compressed nitrogen streams. Unfortunately, it has been found, e.g. as disclosed in U.S. Pat. No. 4,783,201, that, when operated in a cross-flow permeation manner, such membranes may require a stage cut, i.e. the ratio of permeate gas to feed gas flow, of roughly 30% at, for example, 150 psig operation to achieve a relatively modest pressure dewpoint of −40° F. PDP. Obviously, the product gas recovery of such a cross-flow membrane unit would be quite low, and the power and dryer area requirements of such an overall system would be unattractively high. The invention, on the other hand, involves operation of the nitrogen drying membrane unit, desirably in a countercurrent manner, with dry reflux purge being passed on the permeate side of the membrane to carry moisture away from the permeate side of the membrane and maintain a high driving force across the membrane for moisture removal. This processing feature serves to minimize the membrane area required, and the product permeation loss necessary, to achieve a given product dewpoint, i.e., level of drying. It is desirable to maintain nitrogen product loss due to co permeation of said nitrogen to less than 1%, preferably less than 0.5%, of the total product flow.

The overall processing and system arrangement of the invention can be effectively utilized, with a number of relatively dry gas streams being available for use as a reflux purge on the low pressure, permeate side of the membrane dryer. With reference to FIG. 1 of the drawing, a preferred embodiment of the invention is illustrated, with the permeate gas from the second stage of a two stage membrane air separation unit being used as the purge gas for the membrane dryer unit. Feed air is passed in line 1 to air compressor 2 from which compressed air is passed in line 3 to first stage membrane 4 of a two stage membrane air separation unit. Permeate gas, which contains most of the water in the feed air, is withdrawn from said membrane 4 through line 5 and is passed to waste. The non-permeate gas from said membrane 4 is passed in line 6 to second stage membrane 7 from which a purified nitrogen stream is withdrawn in line 8 for passage to deoxo unit 9 to which hydrogen is added through line 10. High purity nitrogen is recovered from deoxo unit 9 through line 11, said high purity stream nevertheless containing moisture and excess hydrogen. After passing through conventional aftercooler unit 12 and moisture separator 13, from which water is removed through line 14, the high purity but wet nitrogen product is passed through line 15 to membrane dryer 16 used in the practice of the invention. The desired nitrogen is recovered from dryer 16 in dry form as non-permeate gas through line 17. The permeate side of the membranes in said membrane dryer 16, which is operated in a countercurrent manner, is purged with a relatively dry purge gas which is the permeate gas from second stage membrane 7. Such purge gas, passed from said membrane 7 in line 18 to the permeate side of membrane dryer 16, carries moisture, which permeates said membrane 16, away from the surface thereof on said permeate side so that a high driving force is maintained across membrane 16 to sustain the desired moisture removal. The moisture-containing purge gas is removed from the permeate side of membrane dryer 16 through line 19, conveniently, as illustrated, for recycle to air feed line 1 for compression and passage to the air separation membrane unit for recovery of additional quantities of nitrogen product therefrom. Alternatively, said moisture-containing purge gas may be discharged to waste through line 20 if so desired.

Figure 2:
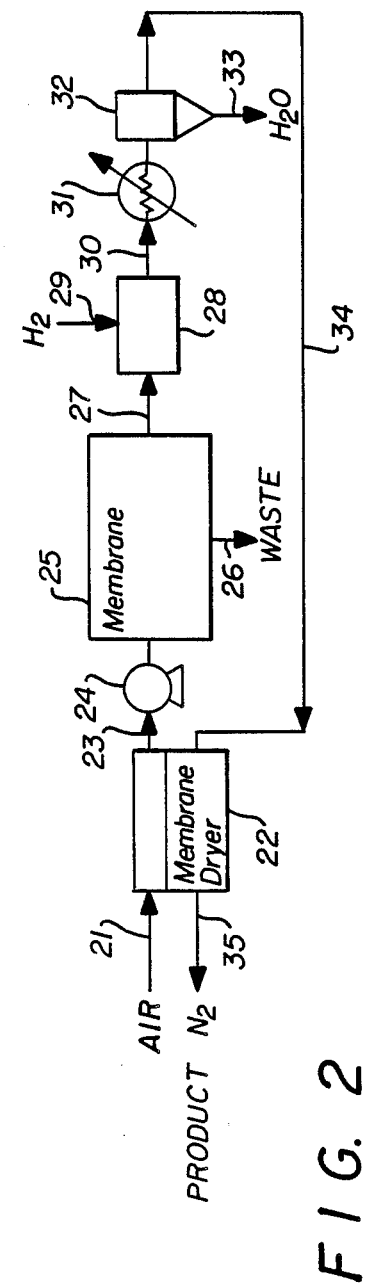
FIG. 2 is a schematic flow diagram of an embodiment in which low pressure feed air is used to provide purge gas to the product dryer membrane system.

In an alternative embodiment as shown in FIG. 2, the feed air stream itself is used as said purge gas for the membrane dryer, instead of the second stage air separation membrane permeate gas as in the FIG. 1 embodiment. As illustrated in FIG. 2, air is passed through line 21 to membrane dryer unit 22, for passage therethrough as purge gas on the low pressure permeate side thereof. Thus, the feed air serves the same purge purposes as were described above with respect to the air separation membrane permeate gas in the FIG. 1 embodiment. Feed air, containing moisture removed from the permeate side of membrane dryer 22, is passed in line 23 to feed air compressor 24 and to membrane air separation unit 25, which may comprise two stages but which is shown for convenience as a single unit. Permeate gas comprising waste material of the process is withdrawn from air separation membrane unit 25 through line 26, while thus-purified nitrogen non-permeate gas is withdrawn from said membrane unit 25 in line 27 for passage to deoxo unit 28, to which hydrogen is passed in line 29. Wet, high purity nitrogen passes from deoxo unit 28 in line 30 to aftercooler unit 31 and moisture separator 32, for removal of water therefrom through line 33. Wet, high purity nitrogen removed therefrom is passed in line 34 to membrane dryer 22, from which dry, high purity nitrogen is recovered through line 35. In this embodiment, the dryness achievable is not as much as in the FIG. 1 embodiment and is determined by the dryness of the feed air.

Figure 3:
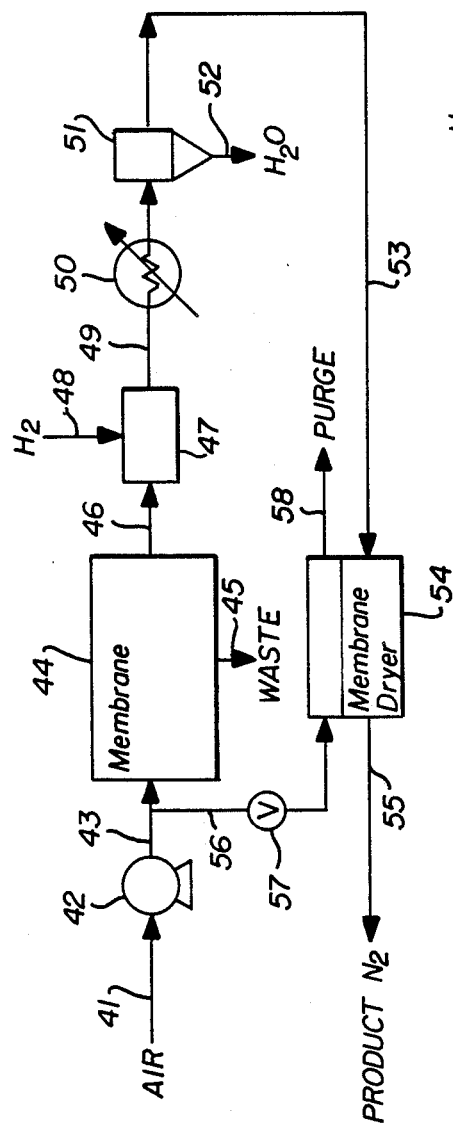
FIG. 3 is a schematic flow diagram of an embodiment in which a portion of the high pressure feed air to the membrane/deoxo units is expanded and used to provide purge gas to the product dryer membrane system.

In the FIG. 3 variation, a portion of the compressed feed air stream is expanded and used as the low pressure purge gas for the membrane dryer. Thus, feed air in line 41 is compressed in air compressor 42 and is passed in line 43 to air separation membrane system 44, from which the permeate gas is discharged to waste through line 45. A purified nitrogen stream is passed from membrane system 44 in line 46 to deoxo unit 47 to which hydrogen is passed in line 48. High purity nitrogen is passed from deoxo unit 47 in line 49, and is passed to aftercooler unit 50 and moisture separator 51, from which water is discharged in line 52. The wet, high purity nitrogen stream leaving said moisture separator 51 is passed in line 53 to membrane dryer unit 54, from which dry, high purity nitrogen non-permeate gas is recovered through line 55. In this embodiment, a slip stream from the compressed air in line 43 is withdrawn in line 56. Said slip stream is expanded to lower pressure in expansion valve 57 positioned in said line and is then passed to the low pressure permeate side of said membrane dryer unit 54 as purge gas for the purposes of the invention indicated with reference to the FIG. 1 embodiment. The purge gas is withdrawn from membrane dryer 54 through line 58.

Figure 4:
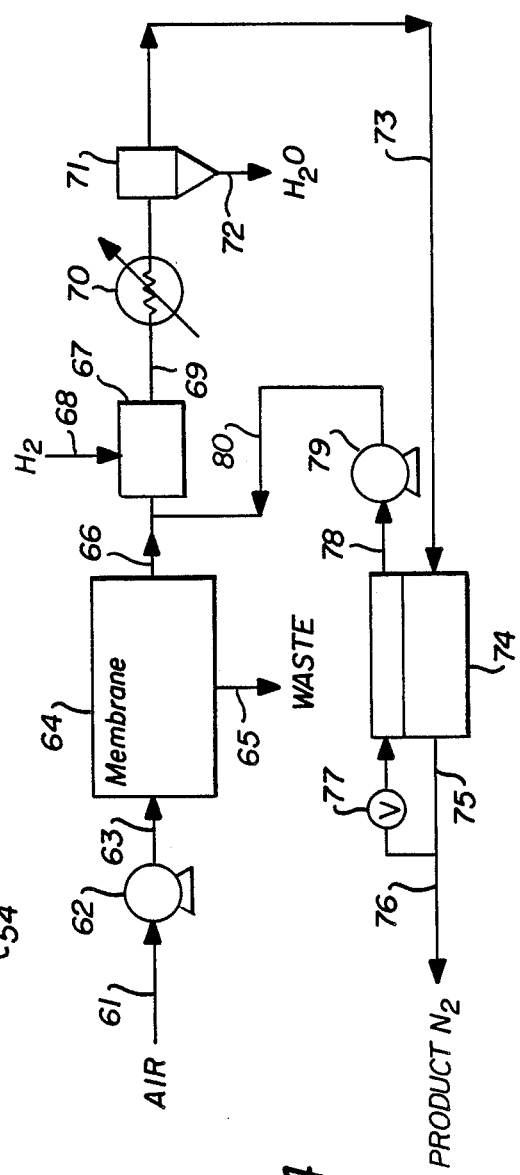
FIG. 4 is an embodiment in which a portion of the dry product gas is recycled to provide purge gas to the product dryer membrane system.

A further processing alternative is shown in FIG. 4 in which feed air is passed in line 61 to air compressor 62 and therefrom in line 63 to air separation membrane unit 64, from which the permeate stream is discharged to waste through line 65. Purified nitrogen, e.g. 98% nitrogen or above depending on the number of membrane stages employed, is passed in line 66 to deoxo unit 67. Hydrogen is added thereto through line 68. Purified nitrogen is passed therefrom in line 69 to aftercooler unit 70 and moisture separator 71, from which water is removed in line 72. Wet, high purity nitrogen is passed from moisture separator 71 in line 73 to product dryer membrane unit 74, from which dry, high purity nitrogen product is recovered as non-permeate gas in line 75 In this embodiment, a slip stream of said nitrogen product is withdrawn from line 75 through line 76. Upon expansion to lower pressure in expansion valve 77 positioned in said line 76, the portion of said dry, high purity nitrogen product passed through said slip stream line 76 is passed on the permeate side of the membranes in membrane dryer unit 74 as a purge gas facilitating the carrying away of moisture from said permeate side of the membrane and maintaining a high driving force across the membrane for the desired moisture removal from the product nitrogen stream. Said purge gas and permeate moisture are removed from said dryer unit 74 through line 78, compressed in compressor 79, and recycled in line 80 for passage to deoxo unit 67 with purified nitrogen in line 66.

Apart from the integration of the air separation membrane/dexo units with the membrane dryer unit as disclosed above, it will be appreciated that the membrane composition used in the membrane dryer should be one having a high selectivity for water over nitrogen. That is, moisture must be selectively permeated much more rapidly than nitrogen. The water/nitrogen separation factor should be at least 50, preferably greater than 1,000, for advantageous moisture removal from product nitrogen gas. In addition, the membrane composition should have a relatively low permeability rate for both nitrogen and oxygen. Cellulose acetate is an example of a preferred membrane separation material satisfying such criteria. It will be appreciated that a variety of other materials can also be employed, such as ethyl cellulose, silicone rubber, polyurethane, polyamide, polystyrene and the like.

The dryer membrane of desirable membrane composition, which is integrated with the air separation membrane/deoxo units as disclosed and claimed herein, is preferably operated with a countercurrent flow pattern. In the hollow fiber membrane configuration or in other suitable membrane configurations, e.g. spiral wound membranes, bundle designs providing for flow patterns of the cross-flow type have been commonly employed in commercial practice. In cross-flow operation, the flow direction of permeate gas on the permeate side of the membrane is at right angles to the flow of feed gas on the feed side of the membrane. For example, in the use of hollow fiber bundles and the passage of feed gas on the outside of the hollow fiber membranes, the flow direction of permeate in the bores of the fibers is generally at right angles to the flow of feed over the external surface of the hollow fibers. Likewise, in the inside-out approach in which the feed gas is passed through the bores of the hollow fibers, the permeate gas generally passes from the surface of the hollow fibers in a direction generally at right angles to the direction of the flow of feed within the bores of the hollow fibers and then, within the outer shell, in the direction of the outlet means for the permeate gas. As shown in European Patent Application Publication No. 0 226 431, published June 24, 1987, countercurrent flow patterns can be created by the encasing of the hollow fiber bundle within an impervious barrier over the entirety of its longitudinal outer surface except for a non encased circumferential region near one end of said bundle. This enables the feed gas or permeate gas, depending on the desired manner of operation, i.e. inside-out or outside-in, to pass in countercurrent flow outside the hollow fibers parallel to the flow direction of permeate gas or feed gas in the bores of the hollow fibers. The feed gas on the outside of the hollow fiber bundle, for example, is caused to flow parallel to, rather than at right angle to, the central axis of the fiber bundle. It will be understood that the membrane fibers may be organized either in straight assemblies parallel to the central axis of the bundle, or alternatively, can be wound in helical fashion around the central axis. In any event, the impermeable barrier material may be a wrap of impervious film, e.g., polyvinylidene or the like. Alternatively, the impermeable barrier may be an impervious coating material, e.g. polysiloxane, applied from an innocuous solvent, or a shrink sleeve installed over the membrane bundle and shrunk onto said bundle. The impermeable barrier thus encases the hollow fiber or other membrane bundle and, as disclosed in said publication, has an opening therein permitting the flow of gas into or from the bundle so that the fluid flows in a direction substantially parallel to the axis of the fiber bundle. For purposes of the invention, the flow pattern should be one of countercurrent flow of the wet, high purity nitrogen feed stream and the permeate gas comprising purge gas supplied as indicated above together with moisture and hydrogen that permeate through the membrane material in the nitrogen product dryer membrane.

It should be noted that membrane drying operations are commonly carried out in the art using a dense fiber membrane. The membrane thickness for a dense fiber is also the wall thickness, and is very large in comparison to the skin portion of an asymmetric membrane or to the separation layer of a composite membrane. For a dense fiber, it is necessary to have a large wall thickness to achieve a significant pressure capability. Thus, dense fibers have a very low permeability rate and require the use of a very large surface area for adequate drying of the nitrogen product. By contrast, asymmetric or composite membranes, preferred over dense membranes for purposes of the invention, have very thin membrane separation layers, with the relatively more porous substrate portion of said membranes providing mechanical strength and support for the very thin portion that determines the separation characteristics of the membrane. Much less surface area is required, therefore, for asymmetric or composite membranes than for dense, homogeneous membranes. Because of the inherently improved permeability obtainable by the use of asymmetric or composite membranes rather than dense membranes, it is desirable to further improve asymmetric and composite membrane performance in preferred embodiments of the invention, as related to the drying of nitrogen product, so as to achieve significant reduction in the loss of valuable product nitrogen by co-permeation that would occur in cross-flow operation of such membranes.

The preferred source for reflux purge gas is the second stage permeate of a two stage membrane air separation unit. This source is relatively dry and low in oxygen content, such contaminants having been preferentially permeated in the first stage of said air separation unit. When the air separation membrane unit is in two stages, the membrane area split between the stages will determine how much purge gas will be available and how much of the contaminants will be present. For a given product purity, a larger area fraction in the first stage means a smaller, but drier second stage permeate flow, and thus a lesser amount of available purge gas. An amount of purge gas of at least 30%, generally 60% or more of the product nitrogen, based on the amount of permeable gas in the low pressure permeate side of the membrane will typically be available from this source. For purposes of the invention, a purge ratio, i.e. reflux purge gas/product gas flow on the non permeable side, of at least about 10%, but preferably about 20% or above, is desired to keep area requirements, product loss and back diffusion of residual oxygen to a minimum. The purge ratio requirements also tend to be greater at relatively lower product gas pressures than at higher pressures. The amount of any such oxygen back diffusion that can be tolerated will be understood to be dependent on the overall requirements of a particular application. In many instances, it is desirable to limit back diffusion of oxygen to a maximum of 500 ppmv, with such oxygen back diffusion being preferably less that 100 ppmv in the nitrogen product. The amount of reflux purge gas available will, of course, depend on its source and value.

In an illustrative example of the invention, nitrogen product is dried to a product pressure dewpoint of −40° F. using the FIG. 1 embodiment of the invention. The nitrogen product stream to be dried has a pressure of 154.7 psia, and is passed to the membrane dryer unit at a temperature of 100° F., said stream having an oxygen content of less that 5.0 ppmv and a saturated water condition. Purge gas from said second stage air separation membrane is supplied at 16 psia, and the purge ratio of purge gas to product gas is about 15%. The composite membrane used in the membrane dryer unit comprises hollow fibers in a helical configuration and has a water/nitrogen separation factor of 6,000, and a water/oxygen separation factor of 1,000. The membrane dryer unit is operated using an impervious barrier of polyvinylidene to encase the membrane and create a countercurrent flow pattern in the membrane module. In operation, the high purity nitrogen product gas is effectively dried as indicated above with a very low dry product loss of less than 0.5% nitrogen. In the less preferred, completely cross-flow membrane embodiment, more than 30% of the dry product would have to be used to achieve the same dewpoint.

It will be appreciated that various changes and modifications can be made in the details of the process and system as herein described without departing from the scope of the invention as set forth in the appended claims. Thus, the catalytic combustion system, i.e. deoxo units, employed can comprise one or more catalytic beds in which the oxygen content of the partially purified nitrogen stream produced in the air separation membrane system is reacted with hydrogen or fuel gas, such as methane. The deoxo unit typically employs a noble metal catalyst, such as a platinum or a platinum-palladium catalyst supported on an alumina substrate.

It will also be understood that the membranes employed for the air separation purposes of the invention may comprise composite membranes in which the separation layer deposited on a porous substrate determines the selectivity characteristics of the membrane, as with cellulose acetate or ethyl cellulose on a polysulfone substrate; and asymmetric membranes of one material, e.g. polysulfone, with two separate morphological regions, one comprising a thin, dense skin region that determines the selectivity characteristics of the membrane and a less dense, porous support region, or variations thereof, such as multicomponent membranes. From a practical viewpoint, the performance characteristics of dense, homogeneous membranes are not generally adequate for commercial application. For the product drying purposes of the invention, an asymmetric or composite membrane structure can be employed, with enhanced overall performance being achieved by the practice of the invention. While dense membranes are commonly used for product drying applications, the use of such dense membranes is not preferred because of the inherent limitations thereof, although such dense membranes could be used in the practice of the invention.

For initial air separation purposes, the membranes employed generally comprise materials capable of selectively permeating oxygen, with nitrogen being the less permeable component of feed air that is recovered as non-permeate gas. It is within the scope of the invention, however, to employ an air separation membrane system in which nitrogen is the more readily permeable component, and an oxygen rich stream is removed as non-permeate stream.

The permeable membranes employed in the practice of the invention will commonly be employed in assemblies of membrane bundles, typically positioned within enclosures to form membrane modules comprising the principal element of a membrane system. A membrane system may comprise a single module or a number of such modules, arranged for either parallel or series operation. The membrane modules can be constructed using bundles of membranes in convenient hollow fiber form, or in spiral wound, pleated flat sheet, or other desired membrane configurations. Membrane modules are constructed to have a feed gas (air) side, and an opposite, permeate gas exit side. For hollow fiber membranes, the feed side can be either the bore side for inside out operation, or the outside of the hollow fibers for outside in operation.

As indicated above, the purge gas employed in the invention should be a dry or a relatively dry purge gas, as from the sources referred to herein. As used herein, a relatively dry purge gas is one having a moisture partial pressure not exceeding the partial pressure of moisture in the dried nitrogen product gas. Preferably, said purge gas moisture partial pressure will be less than half the moisture partial pressure in the product gas stream, as will be the case with respect to the sources of purge gas disclosed above.

The membrane will be seen to provide a highly desirable system and process for drying high purity nitrogen produced in an air separation membrane/deoxo system. By enabling the drying to be accomplished by convenient membrane units, the more costly and complicated adsorptive or refrigerative techniques and systems for moisture removal can be avoided. By utilizing the integration of processing streams of the membrane dryer with the air separation membrane/deoxo units, a purge of the low pressure, permeate side of the membrane dryer unit, is conveniently provided. By utilizing a bundle arrangement so as to establish a countercurrent flow pattern, preferred embodiments of the drying operation can be carried out with an enhanced recovery of dry, high purity nitrogen, avoiding the co-permeation of significant amounts of valuable nitrogen product gas as occurs in cross flow permeation operations.

I claim:

1. An improved process for the production of dry, high purity nitrogen from air in which an air separation membrane system is used to produce purified nitrogen from feed air for passage to a catalytic combustion system for reaction of residual oxygen with hydrogen, the residual wet, high purity nitrogen stream being cooled and passed to condensate removal means prior to drying, the improvement comprising:

(a) passing said wet, high purity nitrogen stream from an air separation membrane system in which it is produced from feed air to a membrane dryer unit capable of selectively permeating water present therein;

(b) recovering dry, high purity nitrogen product gas from the membrane dryer unit as non-permeate gas;

(c) withdrawing water vapor as the permeate gas from the low pressure permeate side of the membrane dryer unit;

(d) passing a relatively dry purge gas to the low pressure permeate side of the membrane dryer unit to facilitate the carrying away of water vapor from the surface of the membrane and maintaining the driving force for removal of water vapor through the membrane from the high purity nitrogen stream for enhanced moisture separation therefrom, said relatively dry purge gas comprising waste gas from said air separation membrane system, feed air of nitrogen product gas, whereby the passage of purge gas on the permeate side of the membrane dryer unit enables the desired moisture removal to be achieved with minimum loss of desired nitrogen product gas.

2. The process of claim 1 in which said membrane dryer unit contains membrane bundles adapted for a countercurrent flow pattern, and including the flowing of the permeate gas generally parallel to the flow of wet, high purity nitrogen feed gas.

3. The process of claim 2 in which the feed air is passed to an air separation system comprising a two stage membrane system, said purge gas passed to the low pressure permeate side of the membrane dryer unit comprising the waste gas from the second stage of said air separation membrane system.

4. The process of claim 3 in which said waste gas comprises the permeate gas from the second stage of the two stage membrane system.

5. The process of claim 3 in which said membrane dryer unit contains membrane bundles adapted for a countercurrent flow pattern with the permeate gas flowing generally parallel to the flow of wet, high purity nitrogen feed gas.

6. The process of claim 3 in which said waste gas comprises the permeate gas from the second stage of the two stage membrane system.

7. The process of claim 2 in which feed air is passed to the permeate side of the membrane dryer unit as said purge gas, said feed gas and moisture carried away therewith, being removed from said membrane dryer unit for compression and passage to said air separation membrane system.

8. The process of claim 7 in which said membrane dryer unit contains membrane bundles adapted for a countercurrent flow pattern with the permeate gas flowing generally parallel to the flow of wet, high purity nitrogen feed gas.

9. The process of claim 2 and including compressing feed air to the desired pressure for passage to the air separation membrane system and withdrawing a portion of said compressed air for passage to the low pressure permeate side of the membrane dryer unit as said purge-gas, said withdrawn portion of compressed air being expanded to lower pressure prior to passage to the membrane dryer unit as said purge gas.

10. The process of claim 9 in which said membrane dryer unit contains membrane bundles adapted for a countercurrent flow pattern with the permeate gas flowing generally parallel to the flow of wet, high purity nitrogen feed gas.

11. The process of claim 2 and including withdrawing a portion of the dry, high purity nitrogen product recovered from the membrane dryer unit as non-permeate gas for passage to the low pressure permeate side of the membrane dryer unit as said purge gas, said withdrawn portion of said high purity nitrogen product being expanded to lower pressure prior to passage to the membrane dryer unit as said purge gas.

12. The process of claim 11 in which said membrane dryer unit contains membrane bundles adapted for a countercurrent flow pattern with the permeate gas flowing generally parallel to the flow of wet, high purity nitrogen feed gas.

13. An improved system for the production of dry, high purity nitrogen from air in which an air separation membrane system produces purified nitrogen from feed air, a catalytic combustion system is adapted to react hydrogen with residual oxygen present in said purified nitrogen to produce a wet, high purity nitrogen stream, and cooling and condensate removal means are incorporated for the processing of said nitrogen stream prior to drying, the improvement comprising:

(a) a membrane dryer unit capable of selectively permeating residual water present in the wet, high purity nitrogen stream;

(b) conduit means for passing said wet, high purity nitrogen feed gas to said membrane dryer unit;

(c) conduit means for recovering dry, high purity nitrogen product gas as non-permeate gas from the membrane dryer unit;

(d) conduit means for passing a relatively dry purge gas to the low pressure permeate side of the membrane dryer unit to facilitate the carrying away of water vapor from the surface of the membrane and maintaining the driving force for removal of water vapor through the membrane from the high purity nitrogen stream for enhanced moisture separation therefrom, said relatively dry purge gas comprising waste gas from said air separation membrane system, feed air or nitrogen product gas, whereby the provision for purge gas on the permeate side of the membrane dryer unit facilitates the desired moisture removal to be achieved with minimum loss of nitrogen product gas.

14. The system of claim 13 in which said membrane dryer unit contains membrane bundles adapted for a countercurrent flow pattern with the permeate gas flowing generally parallel to the flow of wet, high purity nitrogen feed gas.

15. The system of claim 13 in which said air separation membrane system comprises a two stage membrane system, said conduit means for passing purge gas to the membrane dryer unit comprising means for passing the waste stream from the second stage of the air separation membrane system to said membrane dryer unit as said purge gas.

16. The system of claim 15 in which said waste stream from the second stage of the air separation system comprises the permeate gas from said second stage.

17. The system of claim 15 in which said membrane dryer unit contains membrane bundles adapted for a countercurrent flow pattern with the permeate gas flowing generally parallel to the flow of wet, high purity nitrogen feed gas.

18. The system of claim 13 in which said conduit means for passing purge gas to the low pressure permeate side of the membrane dryer unit comprises conduit means for passing feed air to said permeate side of the membrane dryer unit and including means for removing said feed air, and moisture carried away therewith, from said membrane dryer unit for compression and passage to said air separation membrane system.

19. The system of claim 18 in which said membrane dryer unit contains membrane bundles adapted for a countercurrent flow pattern with the permeate gas flowing generally parallel to the flow of wet, high purity nitrogen feed gas.

20. The system of claim 13 and including compression means to compress feed air to the desired pressure for passage to the air separation membrane system, and including conduit means for withdrawing a portion of said compressed air for passage to the low pressure permeate side of the membrane dryer unit as said purge gas, said conduit means having expansion valve means therein to reduce the pressure of the compressed air to the desired low pressure on the permeate side of the membrane dryer unit.

21. The system of claim 20 in which said membrane dryer unit contains membrane bundles adapted for a countercurrent flow pattern with the permeate gas flowing generally parallel to the flow of wet, high purity nitrogen feed gas.

22. The system of claim 13 and including conduit means for withdrawing a portion of said dry, high purity nitrogen product removed from the membrane dryer unit for passage to the low pressure permeate side of the membrane dryer unit as said purge gas, said conduit means having expansion valve means therein to reduce the pressure of the withdrawn portion of said dry, high purity nitrogen to the desired pressure on the permeate side of the membrane dryer unit.

23. The system of claim 22 in which said membrane dryer unit contains membrane bundles adapted for a countercurrent flow pattern with the permeate gas flowing generally parallel to the flow of wet, high purity nitrogen feed gas.

* * * * *